US010988559B2

(12) United States Patent
Yotsumoto et al.

(10) Patent No.: US 10,988,559 B2
(45) Date of Patent: Apr. 27, 2021

(54) FLUOROPOLYMER POWDER AND METHOD FOR PRODUCING SAME

(71) Applicant: DAIKIN INDUSTRIES, LTD., Osaka (JP)

(72) Inventors: Yuki Yotsumoto, Osaka (JP); Tadashi Ino, Osaka (JP); Kazuhiro Ohtsuka, Osaka (JP); Noriyuki Shinoki, Osaka (JP); Masaharu Nakazawa, Osaka (JP); Takashi Yoshimura, Osaka (JP); Masahiro Kondo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 94 days.

(21) Appl. No.: 16/341,527

(22) PCT Filed: Oct. 11, 2017

(86) PCT No.: PCT/JP2017/036808
§ 371 (c)(1),
(2) Date: Apr. 12, 2019

(87) PCT Pub. No.: WO2018/070420
PCT Pub. Date: Apr. 19, 2018

(65) Prior Publication Data
US 2019/0375866 A1 Dec. 12, 2019

(30) Foreign Application Priority Data

Oct. 14, 2016 (JP) .............................. JP2016-202675

(51) Int. Cl.
C08F 214/26 (2006.01)
C08F 2/22 (2006.01)
C08F 216/14 (2006.01)
C08J 3/16 (2006.01)
C08J 7/14 (2006.01)
C08F 8/44 (2006.01)
C08F 8/12 (2006.01)
C08F 2/00 (2006.01)
C08F 2/26 (2006.01)

(52) U.S. Cl.
CPC ............ *C08F 214/26* (2013.01); *C08F 2/001* (2013.01); *C08F 2/22* (2013.01); *C08F 2/26* (2013.01); *C08F 8/12* (2013.01); *C08F 8/44* (2013.01); *C08F 214/262* (2013.01); *C08F 216/1408* (2013.01); *C08J 3/16* (2013.01); *C08J 7/14* (2013.01); *C08F 2800/20* (2013.01); *C08F 2810/00* (2013.01); *C08F 2810/50* (2013.01)

(58) Field of Classification Search
CPC combination set(s) only.
See application file for complete search history.

(56) References Cited

U.S. PATENT DOCUMENTS

| 4,940,525 A * | 7/1990 | Ezzell .................... B32B 27/32 204/252 |
| 2003/0176515 A1* | 9/2003 | Curtin ........................ C08J 3/16 521/28 |
| 2005/0228127 A1 | 10/2005 | Tatemoto et al. |
| 2012/0178017 A1* | 7/2012 | Murai ...................... C08F 8/44 429/482 |
| 2012/0202946 A1* | 8/2012 | Veneroni ................. C08F 14/18 524/805 |
| 2012/0295117 A1* | 11/2012 | Iizuka .................... C08G 73/18 428/421 |

FOREIGN PATENT DOCUMENTS

| EP | 1 596 453 A1 | 11/2005 |
| JP | 2001-504872 A | 4/2001 |
| WO | 98/16581 A1 | 4/1998 |
| WO | 2004/018527 A1 | 3/2004 |
| WO | 2008/082497 A1 | 7/2008 |

OTHER PUBLICATIONS

International Search Report PCT/JP2017/036808 dated Jan. 16, 2018.
Communication dated Feb. 4, 2020 from European Patent Office in EP Application No. 17859936.1.
International Preliminary Report on Patentability with English translation of Written Opinion dated Apr. 16, 2019 in International Application No. PCT/JP2017/036808.

* cited by examiner

*Primary Examiner* — Nicole M. Buie-Hatcher
(74) *Attorney, Agent, or Firm* — Sughrue Mion, PLLC

(57) ABSTRACT

The invention provides a powder that is easily redispersible in a liquid medium such as water. The powder contains a fluoropolymer. The fluoropolymer contains at least one group A selected from the group consisting of —$SO_2Y$, —COOR, —$SO_3X$, —$SO_2NR^1_2$, and —COOX, wherein Y is a halogen atom; R is a C1-C4 alkyl group; X is $M_{1/L}$ or $NR^1_4$, where M is a hydrogen atom or an L-valent metal, the L-valent metal being a metal in group 1, group 2, group 4, group 8, group 11, group 12, or group 13 of the periodic table; and $R^1$s are each individually a hydrogen atom or a C1-C4 alkyl group. The powder exhibits a dispersion of 50% or higher. The dispersion is calculated by filtering a composition obtainable by mixing the powder with water through a mesh having an opening of 20 μm.

8 Claims, No Drawings

FLUOROPOLYMER POWDER AND METHOD FOR PRODUCING SAME

CROSS REFERENCE TO RELATED APPLICATIONS

This application is a National Stage of International Application No. PCT/JP2017/036808 filed Oct. 11, 2017, claiming priority based on Japanese Patent Application No. 2016-202675 filed Oct. 14, 2016.

TECHNICAL FIELD

The invention relates to fluoropolymer powders containing groups such as a sulfonic acid group and a carboxyl group, and methods for producing the same.

BACKGROUND ART

Fluoropolymers containing groups such as a sulfonic acid group and a carboxyl group has recently gained attention as materials for electrolyte membranes of devices such as fuel cells and chemical sensors. Fluoropolymers containing a sulfonic acid salt-type group such as —$SO_3Na$ are used as ion exchange membranes for brine electrolysis.

In production of electrolyte membranes, for example, an aqueous dispersion of a fluoropolymer is awaited as a medium for fixing a catalyst on the surface of an electrolyte membrane in consideration of workability instead of conventional media containing an organic solvent as a main component. An aqueous dispersion of a fluoropolymer itself can be used as a composition for coating and can therefore suitably be used in processes such as cast film production and impregnation. Accordingly, it can be used in a wide variety of applications.

Unfortunately, such an aqueous dispersion is bulk and heavy, and thus is not easy to handle or transport. The fluoropolymer may sediment during transport or storage. Further, the concentration thereof cannot be easily adjusted.

Patent Literature 1 discloses a process for producing dispersion by dispersing flowable particles of an ion-exchange polymer obtained by spray drying in liquid such as water or an organic liquid.

The redispersion step in this process requires great efforts such as stirring for four hours or longer with a stirrer. Thus, this patent literature fails to disclose an easily dispersible powder.

Patent Literature 2 proposes a solid composition containing spherical particles of a fluoropolymer having an acid/acid salt group and an aqueous dispersion thereof.

As described in the examples of Patent Literature 2, a polymer precursor obtained by emulsion polymerization is hydrolyzed to provide an aqueous dispersion of a fluoropolymer containing an acid/acid salt group, and this aqueous dispersion is then dried to provide a solid composition.

For example, Example 5 discloses that a fluoropolymer dispersion containing a fluoropolymer that contains —$SO_3K$ is dried and solidified using a rotary evaporator to provide a solid fluoropolymer composition. Still, the dispersibility thereof is poor (see Comparative Example 5 of the present application).

This aqueous dispersion suffers obstacles such as sedimentation of particles during long-term storage and the resulting uneven concentration.

Although the solid composition causes no uneven concentration, it has poor redispersibility within the scope of the technique disclosed as above and thus cannot be used in practice.

CITATION LIST

Patent Literature

Patent Literature 1: WO 2008/082497
Patent Literature 2: WO 2004/018527

SUMMARY OF INVENTION

Technical Problem

In response to the above issues, the invention aims to provide a powder that is easily redispersible in a liquid medium such as water.

Solution to Problem

The inventors successfully produced a powder having excellent redispersibility by drying an aqueous dispersion of a fluoropolymer having an acid/acid salt group under very limited conditions. Thereby, the inventors completed the invention. More surprisingly, the inventors found that this powder is easily dispersed in a variety of liquid media and solid media.

Specifically, the invention relates to a powder containing a fluoropolymer, the fluoropolymer containing at least one group A selected from the group consisting of —$SO_2Y$, —$COOR$, —$SO_3X$, —$SO_2NR^1_2$, and —$COOX$, wherein Y is a halogen atom; R is a C1-C4 alkyl group; X is $M_{1/L}$ or $NR^1_4$, where M is a hydrogen atom or an L-valent metal, the L-valent metal being a metal in group 1, group 2, group 4, group 8, group 11, group 12, or group 13 of the periodic table; and $R^1$s are each individually a hydrogen atom or a C1-C4 alkyl group, the powder exhibiting a dispersion of 50% or higher, the dispersion being calculated by filtering a composition obtainable by mixing the powder with water through a mesh having an opening of 20 μm.

The powder preferably contains 0 to 20% by mass of volatile matter.

The fluoropolymer preferably contains a constitutional unit derived from a fluoromonomer represented by the following formula (I):

$$CF_2=CF-(O)_{n1}-(CF_2CFY^1-O)_{n2}-(CFY^2)_{n3}-A \qquad (I)$$

wherein $Y^1$ is a halogen atom or a perfluoroalkyl group; n1 is an integer of 0 or 1; n2 is an integer of 0 to 3, with n2 $Y^1$s being the same as or different from each other; $Y^2$ is a halogen atom; n3 is an integer of 1 to 8, with n3 $Y^2$s being the same as or different from each other; and A is the same as the group A.

Preferably, the fluoropolymer is a copolymer of two or more monomers and contains a constitutional unit derived from a fluoromonomer represented by the formula (I) and a constitutional unit derived from a different fluorine-containing ethylenic monomer.

The fluorine-containing ethylenic monomer is preferably at least one species of monomers represented by the following formula (II):

$$CF_2=CF-R_f^1 \qquad (II)$$

wherein $R_f^1$ is a fluorine atom, a chlorine atom, $R_f^2$, or $OR_f^2$, where $R_f^2$ is a C1-C9 linear or branched perfluoroalkyl group optionally containing an ether bond.

Any or all of the monomers represented by the formula (II) are preferably tetrafluoroethylene.

In the formula (I), preferably, $Y^1$ is a trifluoromethyl group, $Y^2$ is a fluorine atom, n1 is 1, n2 is 0 or 1, and n3 is 2.

The invention also relates to a method for producing the aforementioned powder, including:

a step (1) of preparing an aqueous dispersion (a) by emulsion polymerization, the aqueous dispersion (a) containing a fluoropolymer that contains at least one group selected from the group consisting of —$SO_2Y$ and —COOR, wherein Y is a halogen atom; and R is a C1-C4 alkyl group;

a step (2) of adding an alkali or an acid to the aqueous dispersion (a) to provide an aqueous dispersion (b), the aqueous dispersion (b) containing a fluoropolymer that contains at least one group selected from the group consisting of —$SO_3X$, —$SO_2NR^1{}_2$, and —COOX, wherein X is $M_{1/L}$ or $NR^1{}_4$, where M is a hydrogen atom or an L-valent metal, the L-valent metal being a metal in group 1, group 2, group 4, group 8, group 11, group 12, or group 13 of the periodic table; and $R^1$s are each individually a hydrogen atom or a C1-C4 alkyl group;

a step (3) of filtering the aqueous dispersion (b) and collecting a residue; and a step (4) of drying the residue at a work of 200 W or lower to provide a powder containing 0 to 20% by mass of volatile matter.

Advantageous Effects of Invention

The powder of the invention is easily redispersible in a liquid medium such as water.

The production method of the invention can provide a powder that is easily redispersible in a liquid medium such as water.

DESCRIPTION OF EMBODIMENTS

The invention will be specifically described hereinbelow.

The powder of the invention is a fluoropolymer powder exhibiting a dispersion of 50% or higher, the dispersion being calculated by filtering a composition obtainable by mixing the powder with water through a mesh having an opening of 20 μm. The dispersion is preferably 75% or higher. The upper limit thereof may be, but is not limited to, 100% or 99.99%. The powder of the invention exhibits the above dispersion, and thus is more easily redispersible than conventional powders.

The dispersion is calculated by the following method. The powder having a dry mass of X g and an appropriate amount of water are mixed so that a composition containing the fluoropolymer is prepared. The composition is filtered through a mesh having an opening of 20 μm. The filtrate is collected, and the dry mass Y g of the fluoropolymer contained in the filtrate is measured. The dispersion is calculated by the following formula:

Dispersion (%)=$Y/X$×100.

The fluoropolymer contains a group A and thus has high hygroscopy. In consideration of this, the fluoropolymer for calculation of X and Y should be sufficiently dried before measurement of the masses. In order to achieve a high precision, the composition is preferably prepared so as to contain the fluoropolymer in an amount of approximately 5% by mass. The amount of the fluoropolymer in the composition may be 4.6 to 5.4% by mass.

The powder preferably has an average secondary particle size of 0.5 to 10000 μm. The average secondary particle size is more preferably 1 μm or greater and 1000 μm or smaller. The average secondary particle size can be determined using Microtrac MT3300EXII available from MicrotracBEL Corp.

In order to achieve easy handling and transport, the powder preferably contains 0 to 20% by mass of volatile matter. The amount of the volatile matter is more preferably 0.2% by mass or more and 10% by mass or less. The volatile matter content can be determined using a halogen moisture analyzer MB45 available from Ohaus Corp. Since the fluoropolymer has high hygroscopy, the powder usually contains a small moisture content.

In order to maintain the volatile matter content, the powder may be stored together with a known desiccant.

In order to achieve much better redispersibility in a liquid medium, the fluoropolymer preferably has an equivalent weight EW (dry weight in gram of the fluoropolymer per equivalent of proton exchange group) of 1000 or lower. The upper limit thereof is more preferably 800, still more preferably 650, most preferably 550.

In order to achieve excellent productivity of the fluoropolymer, the equivalent weight EW is preferably 200 or higher. The lower limit thereof is more preferably 250, still more preferably 300, most preferably 400.

The equivalent weight EW can be determined by salt substitution of the fluoropolymer and back titration of the resulting solution with an alkali solution.

The fluoropolymer contains at least one group A selected from the group consisting of —$SO_2Y$, —COOR, —$SO_3X$, —$SO_2NR^1{}_2$, and —COOX, wherein Y is a halogen atom; R is a C1-C4 alkyl group; X is $M_{1/L}$ or $NR^1{}_4$; M is a hydrogen atom or an L-valent metal, the L-valent metal being a metal in group 1, group 2, group 4, group 8, group 11, group 12, or group 13 of the periodic table; and $R^1$s are each individually a hydrogen atom or a C1-C4 alkyl group.

In order to achieve much easier redispersion, the group A is preferably at least one group selected from the group consisting of —$SO_3X$, —$SO_2NR^1{}_2$, and —COOX, more preferably at least one group selected from the group consisting of —$SO_3X$ and —COOX.

X is preferably H, Na, K, or Ca. In order to avoid an influence of the metal component on the final product, H is more preferred.

The fluoropolymer preferably contains a constitutional unit derived from a fluoromonomer represented by the following formula (I):

$$CF_2=CF-(O)_{n1}-(CF_2CFY^1O)_{n2}-(CFY^2)_{n3}-A \qquad (I)$$

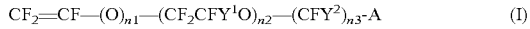

wherein $Y^1$ is a halogen atom or a perfluoroalkyl group; n1 is an integer of 0 or 1; n2 is an integer of 0 to 3; n2 $Y^1$s are the same as or different from each other; $Y^2$ is a halogen atom; n3 is an integer of 1 to 8; n3 $Y^2$s are the same as or different from each other; and A is the same as the group A.

The halogen atom for each of $Y^1$ and $Y^2$ may be, but is not limited to, any of a fluorine atom, a chlorine atom, a bromine atom, or an iodine atom. A fluorine atom is preferred. Examples of the perfluoroalkyl group include, but are not limited to, a trifluoromethyl group and a pentafluoroethyl group. In the formula, n1 is preferably 1, n2 is preferably 0 or 1, and n3 is preferably 2, 3, or 4, more preferably 2.

The fluoromonomer is preferably one in which $Y^1$ is a trifluoromethyl group, $Y^2$ is a fluorine atom, n1 is 1, n2 is 0 or 1, and n3 is 2 in the formula (I).

The fluoropolymer is preferably a copolymer, that is obtainable from two or more monomers and contains a constitutional unit derived from a fluoromonomer represented by the formula (I) and a constitutional unit derived from a different fluorine-containing ethylenic monomer. The fluorine-containing ethylenic monomer may be any monomer that is copolymerizable with a fluoromonomer represented by the formula (I) and contains a vinyl group, and it is different from the fluoromonomer represented by the formula (I).

For example, the fluorine-containing ethylenic monomer is preferably at least one species of monomers represented by the following formula (II):

$$CF_2{=}CF{-}R_f^1 \quad (II)$$

wherein $R_f^1$ is a fluorine atom, a chlorine atom, $R_f^2$, or $OR_f^2$, where $R_f^2$ is a C1-C9 linear or branched perfluoroalkyl group optionally containing an ether bond. Any or all of the monomers represented by the formula (II) are more preferably tetrafluoroethylene.

Examples of the fluorine-containing ethylenic monomer include hydrogen-containing fluoroethylenic monomers represented by the following formula (III):

$$CHY^3{=}CFY^4 \quad (III)$$

wherein $Y^3$ is a hydrogen atom or a fluorine atom; $Y^4$ is a hydrogen atom, a fluorine atom, a chlorine atom, $R_f^3$, or $-OR_f^3$, where $R_f^3$ is a C1-C9 linear or branched fluoroalkyl group optionally containing an ether bond.

The fluorine-containing ethylenic monomer is preferably at least one selected from the group consisting of $CF_2{=}CF_2$, $CH_2{=}CF_2$, $CF_2{=}CFCl$, $CF_2{=}CFH$, $CH_2{=}CFH$, $CF_2{=}CFCF_3$, and fluorovinyl ether represented by $CF_2{=}CF{-}O{-}R_f^4$, wherein $R_f^4$ is a C1-C9 fluoroalkyl group or a C1-C9 fluoropolyether group. The fluorovinyl ether is preferably a perfluoroalkyl group in which the number of carbon atoms in $R_f^4$ is 1 to 3.

In particular, the fluorine-containing ethylenic monomer is preferably a perfluoroethylenic monomer, more preferably $CF_2{=}CF_2$. One or two or more of the fluorine-containing ethylenic monomers may be used.

In addition to the fluorine-containing ethylenic monomer, the fluoropolymer may further contain any of different copolymerizable monomers which can impart a variety of functions to the fluoropolymer to the extent that the basic functions of the fluoropolymer are not impaired. The different copolymerizable monomers may be any monomers appropriately selected from copolymerizable monomers in accordance with the purposes such as control of polymerization speed, control of polymer composition, control of mechanical physical properties such as elastic modulus, and introduction of crosslink site. Examples thereof include monomers containing two or more unsaturated bonds such as perfluorodivinyl ether and monomers containing a cyano group such as $CF_2{=}CFOCF_2CF_2CN$.

The fluoropolymer preferably has a fluoromonomer unit content of 5 to 40 mol %.

The term "fluoromonomer unit" as used herein means a moiety of the molecular structure of the fluoropolymer and a moiety derived from a fluoromonomer represented by the formula (I).

The term "fluoromonomer unit content" as used herein means the proportion of the number of moles of the fluoromonomer generating the fluoromonomer unit in the number of moles of the monomers generating all the monomer units in the fluoropolymer molecule. The term "all the monomer units" as used herein means all the moieties derived from the monomers in the molecular structure of the fluoropolymer. The term "monomers generating all the monomer units" as used herein means the whole amount of the monomers constituting the fluoropolymer.

The fluoromonomer unit content is a value determined by infrared absorption spectrum analysis (IR) or melt-state NMR at 300° C.

The invention also relates to a method for producing the aforementioned powder, including:

a step (1) of preparing an aqueous dispersion (a) by emulsion polymerization, the aqueous dispersion (a) containing a fluoropolymer that contains at least, one group selected from the group consisting of $-SO_2Y$ and $-COOR$, wherein Y is a halogen atom; and R is a C1-C4 alkyl group;

a step (2) of adding an alkali or an acid to the aqueous dispersion (a) to provide an aqueous dispersion (b), the aqueous dispersion (b) containing a fluoropolymer that contains at least one group selected from the group consisting of $-SO_3X$, $-SO_2NR^1{}_2$, and $-COOX$, wherein X is $M_{1/L}$ or $NR^1{}_4$, where M is a hydrogen atom or an L-valent metal, the L-valent metal being a metal in group 1, group 2, group 4, group 8, group 11, group 12, or group 13 of the periodic table; and $R^1$s are each individually a hydrogen atom or a C1-C4 alkyl group;

a step (3) of filtering the aqueous dispersion (b) and collecting a residue; and a step (4) of drying the residue at a work of 200 W or lower to provide a powder containing 0 to 20% by mass of volatile matter.

In the step (1), emulsion polymerization is performed to provide an aqueous dispersion (a) containing a fluoropolymer that contains at least one group selected from the group consisting of $-SO_2Y$ and $-COOR$, wherein Y is a halogen atom; and R is a C1-C4 alkyl group.

The fluoropolymer contained in the aqueous dispersion (a) is obtainable by polymerizing a fluoromonomer containing $-SO_2Y$ or $-COOR$ among the fluoromonomers represented by the formula (I) and a fluorine-containing ethylenic monomer. As described here, production of the fluoropolymer by emulsion polymerization using a fluoromonomer containing $-SO_2Y$ or $-COOR$ among the fluoromonomers represented by the formula (I) can provide an aqueous dispersion (a) containing substantially spherical particles of the fluoropolymer. Thereby, the aforementioned powder redispersible in a liquid medium can be produced.

The emulsion polymerization may be performed in an aqueous reaction medium using an emulsifier and/or an emulsifying active agent. The emulsifier may be an emulsifier usually used in conventional emulsion polymerization or may be one different from the known emulsifiers, or both a known emulsifier and a novel emulsifier may be used.

The emulsifier used may be a compound containing a dissociative polar group and a C4-C12 fluoroalkyl group optionally containing oxygen. Examples thereof include ammonium perfluorooctanoate ($C_7F_{15}COONH_4$), perfluorohexanoic acid ($C_5F_{11}COONH_4$), and $CF_3OCF(CF_3)CF_2OCF(CF_3)COONH_4$. The emulsifier in the emulsion polymerization may generally be used in an amount of 0.01 to 10% by mass of the aqueous reaction medium.

The emulsifying active agent may be a fluoromonomer containing $-SO_3M_{1/L}$, $-SO_3NR^1{}_4$, $-COONR^1{}_4$, or $-COOM_{1/L}$, wherein M is a hydrogen atom or an L-valent metal, the L-valent metal being a metal in group 1, group 2, group 4, group 8, group 11, group 12, or group 13 of the periodic table; and $R^1$s are each individually a hydrogen atom or a C1-C4 alkyl group. The emulsifying active agent is particularly preferably a fluoromonomer that can be involved in a polymerization reaction to provide a polymer emulsifier, such as $CF_2=CFOCF_2CF_2SO_3Na$, $CF_2=CFOCF_2CF(CF_3)OCF_2CF_2SO_3Na$, or $CF_2=CFOCF_2CF(CF_3)OCF_2CF_2CO_2Na$. The fluoromonomer has an emulsifying effect in emulsion polymerization and is an ethylenic compound. Thus, the fluoromonomer can be added as a monomer in the polymerization reaction and can be polymerized so as to be at least part of the molecular structure of the fluoropolymer.

The presence of such an emulsifying active agent allows the aqueous reaction medium to be emulsified even without a known emulsifier. This enables emulsion polymerization without an emulsifier.

In emulsion polymerization, some polymerization conditions may generate a smaller number of fluoropolymer particles with large particle sizes, resulting in formation of an uneven film. Thus, in some cases, the emulsion polymerization is preferably performed in the presence of the emulsifier. In order to increase the number of particles, a large amount of an emulsifier may be used in polymerization to provide a dispersion, and then this dispersion may be diluted and the polymerization may be continued, in other words, "seed polymerization" may be performed.

The term "aqueous reaction medium" as used herein means a medium containing water to be used in the polymerization, and may be water itself or a medium obtainable by dissolving or dispersing an organic medium in water. The aqueous reaction medium preferably contains no organic medium or preferably contains a slight amount thereof even when containing an organic medium.

The polymerization reaction may be performed using a polymerization initiator. Examples of the polymerization initiator include, but are not limited to, those usually used in polymerization for fluoropolymers, such as organic peroxides, inorganic peroxides, and azo compounds. In particular, ammonium persulfate (APS) is preferred. The amount of the polymerization initiator is preferably 0.01 to 1% by mass of the sum of all the monomers used in the polymerization reaction.

The aqueous reaction medium in the polymerization reaction preferably has a pH of 4 to 7. The aqueous reaction medium having a pH within this range enables smooth progress of the polymerization reaction and can minimize hydrolysis of —$SO_2Y$ and/or —COOR (wherein Y and R are defined as mentioned above) of the fluoromonomer and/or the fluoropolymer during the polymerization reaction.

The polymerization reaction may be performed in any reaction conditions, including the reaction temperature, and may be performed in accordance with a usual method.

The fluoropolymer obtained in the step (1) is usually contained in the form of particles in the aqueous dispersion (a).

In order to easily provide powder having good redispersibility, the particles preferably contains 25% by mass or more or fluoropolymer spherical particles that are substantially in the form of spheres. The phrase "containing 25% by mass or more of fluoropolymer spherical particles" as used herein means that 25% by mass or more of the fluoropolymer particles are fluoropolymer spherical particles.

A criteria for the particle shape of the particles may be an aspect ratio. The phrase "substantially in the form of spheres" as used herein means that the aspect ratio is 3 or lower. In general, the closer to 1 the aspect ratio is, the closer to a sphere the particle is. The aspect ratio of the fluoropolymer particles is preferably 3 or lower. The upper limit thereof is more preferably 2, still more preferably 1.5.

The fluoropolymer particles containing 25% by mass or more of fluoropolymer spherical particles that are substantially in the form of spheres enable, for example, a lower viscosity of an aqueous dispersion of a purified fluoropolymer and a higher solid content of the aqueous dispersion of the purified fluoropolymer than fluoropolymer particles having substantially non-spherical shapes. This may result in high productivity in production of a film by, for example, casting film formation.

The fluoropolymer particles more preferably contain 50% by mass or more of fluoropolymer spherical particles.

In order to easily provide powder having good redispersibility, the particles preferably have an average particle size (average primary particle size) of 10 nm or greater. In order to achieve good stability of the aqueous dispersion (a) and easiness of producing a fluoropolymer, the upper limit of the average particle size may be 300 nm, for example, as long as it falls within the above range. The particles more preferably have an average particle size of 10 to 300 nm. The lower limit of the average particle size is still more preferably 30 nm, while the upper limit thereof is still more preferably 160 nm.

The fluoropolymer preferably has a melt flow rate (MFR) of 0.05 to 50 g/10 min, more preferably 0.1 to 30 g/10 min, still more preferably 0.2 to 20 g/10 min. The MFR is determined using a melt indexer at 270° C. and a load of 2.16 kg in accordance with JIS K7210, and represents the mass by gram of the fluoropolymer extruded per 10 minutes.

The aspect ratio and the average particle size are determined as follows. Specifically, the aqueous dispersion (a) is applied to a glass plate and the aqueous dispersion medium is removed to provide an aggregate of the particles. This aggregate is observed using, for example, a scanning or transmission electron microscope or an atomic force microscope and an image thereof is obtained. For any 20 or more particles in the image, the lengths of the major axis and the minor axis are measured. Then, the ratio of the major axis length to the minor axis length (major axis/minor axis) is determined as the aspect ratio and the average value of the lengths of the major axis and the minor axis is determined as the average particle size.

In the step (2), an alkali or an acid is added to the aqueous dispersion (a) to provide a dispersion (b) containing a fluoropolymer that contains at least one group selected from the group consisting of —$SO_3X$, —$SO_2NR^1_2$, and —COOX, wherein X is $M_{1/L}$, or $NR^1_4$, where M is a hydrogen atom or an L-valent metal, the L-valent metal being a metal in group 1, group 2, group 4, group 8, group 11, group 12, or group 13 of the periodic table; and $R^1$s are each individually a hydrogen atom or a C1-C4 alkyl group.

Examples of the alkali include aqueous solutions of hydroxides of alkali metal or alkaline earth metal such as sodium hydroxide and potassium hydroxide. Examples of the acid include mineral acids such as hydrochloric acid, sulfuric acid, and nitric acid and organic acids such as oxalic acid, acetic acid, formic acid, and trifluoroacetic acid. This step is also preferably such that treatment with an alkali is first performed, followed by treatment with an acid.

The acid treatment in the step (2) is also preferably such that the aqueous dispersion (a) or the aqueous dispersion (a) mixed with an alkali is brought into contact with cation exchange resin. For example, the acid treatment may be performed by passing the aqueous dispersion (a) through a container filled with cation exchange resin.

In the step (3), the aqueous dispersion (b) is filtered and the residue is collected.

The filtering is preferably ultrafiltration. The ultrafiltration may be any method of using an ultrafiltration device provided with an ultrafiltration membrane to remove low molecular weight impurities, and examples thereof include centrifugal ultrafiltration, batch ultrafiltration, and circulation ultrafiltration. The ultrafiltration membrane and the ultrafiltration device provided with an ultrafiltration membrane are appropriately selected in accordance with factors such as the molecular weight and type of low molecular weight impurities to be removed, the type of an aqueous medium, and the molecular weight and type of the fluoropolymer. Examples of the low molecular weight impurities include surfactants such as fluorine-containing anion surfactants. The ultrafiltration device provided with an ultrafiltration membrane may suitably be a commercially available one. Examples thereof in an experimental context include Centriprep (trade name, Amicon) and Millitan (trade name, Millipore Corp.). The ultrafiltration can also remove salts generated during hydrolysis. The ultrafiltration also enables concentration of the resulting fluoropolymer.

In the production method of the invention, the ultrafiltration may be performed together with an operation of adding purified water to the fluoropolymer aqueous dispersion, which is an article to be treated, and an operation of adding an acid to control the pH of the fluoropolymer aqueous dispersion, which is a liquid to be treated, to 3 or lower. Specifically, in the case of treatments by centrifugal ultrafiltration and batch ultrafiltration, purified water or an acid may be added to the treated liquid and this mixture may be again subjected to the ultrafiltration treatment. In the case of circulation ultrafiltration, purified water or an acid may appropriately be added into a tank for the treated liquid.

An appropriate way of determining the completion of the ultrafiltration is to determine it based on the amount of impurities contained in the filtrate. A convenient way in the method of adding purified water is to determine the completion based on the electric conductivity of the filtrate. In the method of adding an acid, examples thereof include a method in which substances such as alkali metals are quantified by ICP analysis or atom absorption analysis and a method in which the filtrate is subjected to acid-base titration and the timing at which the acid is no longer consumed is determined as the completion. For convenience, the latter method is preferred.

In the step (4), the residue is dried to provide a powder containing 0 to 20% by mass of volatile matter. The amount of the volatile matter is more preferably 0.2% by mass or more and 10% by mass or less.

In the production method, the drying in the step (4) is performed at a work of 200 W or lower. The work is preferably 0 W or higher.

Examples of methods of the drying include spray drying, hot air drying, hot air in-box drying, fluidized bed drying, vacuum drying, freeze drying, conductive heat transfer drying, and heat drying under reduced pressure. In order to easily control the particle size and to provide a narrow particle size distribution of powder, spray drying or freeze drying is preferred. Further, in order to provide powder in the form of spheres and having excellent fluidity, spray drying is more preferred.

The work in the case of convective drying is calculated by the following formula. The "convective drying" as used herein means a method of drying the residue by hot air drying, hot air in-box drying, spray drying, fluidized bed drying, vacuum drying, or the like.

$$Q = hA(T_2 - T_1)$$ Formula:

wherein Q: work, h: heat transfer coefficient, A: heat transfer area, $T_1$: temperature of dried product, $T_2$: temperature of fluid gas The work in the case of heat transfer drying is calculated by the following formula. The "heat transfer drying" as used herein means a method of drying the residue by the use of an evaporator, by conductive heat transfer drying, or the like.

$$Q = \lambda A \Delta T / \Delta x$$ Formula:

wherein Q: work, λ: thermal conductivity, A: heat transfer area, ΔT: difference in temperature, Δx: heat transfer distance Specific examples of drying methods at a work of 200 W or lower include hot air drying at 80° C. or lower, freeze drying, drying with a spray dryer, and fluidized bed drying. The hot air drying is preferably performed at 55° C. or lower.

The powder of the invention hardly contains moisture, and thus can suitably be dispersed in a nonaqueous solvent. Further, the powder has an easily re-dispersible feature, and thus enables preparation immediately before processing. Accordingly, the processing can be performed without obstacles such as sedimentation.

EXAMPLES

The invention is described hereinbelow with reference to, but is not limited to, examples.

The parameters in the examples were determined by the following methods.

Solid Content

The volatile matter content was determined by heating weight reduction using a halogen moisture analyzer MB45 available from Ohaus Corp. The solid content was calculated as the difference between the whole amount and the volatile matter content.

Dispersion (Redispersibility Test)

(1) First, 190 g of ion exchange water was put into a 500-mL beaker and stirred at 200 rpm using a propeller-type stirring impeller.

(2) Second, the fluoropolymer powder produced in one of the examples and comparative examples was put into the beaker under stirring, and the mixture was stirred for three minutes. The moisture content was determined by heating weight reduction. Thereby, the dry weight X (g) of the fluoropolymer powder was determined.

(3) Third, the stirring was stopped three minutes later. The mixture was transferred to a 300-mL beaker while filtered through a metal mesh having an opening of 20 μm.

(4) Finally, a sample was taken at a portion in the middle of the height of the filtrate and 10 mm or more apart from the wall surface. The moisture content was determined by heating weight reduction so that the dry weight Y (g) was determined, and the dispersion was calculated by the following formula.

The measurement device used for the heating weight reduction was the following device.

Heating weight reduction: halogen moisture analyzer MB45 available from Ohaus Corp.

Dispersion (%) = Y/X × 100

X: dry weight X (g) of fluoropolymer powder added in step (2) of redispersibility test Y: dry weight Y (g) of fluoropolymer powder measured in step (4) of redispersibility test
Work
The work was calculated by the following method. <Convective drying> (applicable to heat drying and spray drying)

$$Q = hA(T_2 - T_1) \quad \text{Formula:}$$

Q: work, h: heat transfer coefficient, A: heat transfer area, $T_1$: temperature of dried product, $T_2$: temperature of fluid gas In heat drying, the amount of gas flow was constant, and thus the heat transfer coefficient h was regarded as a constant value of 29 for the calculation.

In spray drying, the particle size was constant, and thus the heat transfer coefficient h was regarded as a constant value of 2787 for the calculation.

The drying was started at room temperature, and thus the temperature $T_1$ of the dried product was regarded as a constant value of 25 for the calculation.
<Heat Transfer Drying>(Applicable to Drying with Rotary Evaporator)

$$Q = \lambda A \Delta T / \Delta x \quad \text{Formula:}$$

Q: work, λ: thermal conductivity, A: heat transfer area, ΔT: difference in temperature, Δx: heat transfer distance
Average Primary Particle Size The particle size (average primary particle size) of the fluoropolymer precursor in the dispersion obtained in each synthesis example was determined by dynamic light scattering using NanotracWave available from MicrotracBEL Corp.
Melt Flow Rate (MFR)

The melt flow rate was determined using a melt indexer at 270° C. and a load of 2.16 kg in accordance with JIS K7210.
Equivalent Weight (EW)

The equivalent weight was determined by salt substitution of the polymer obtained from the dispersion of a fluoropolymer precursor and back titration of the resulting solution with an alkali solution.

Synthesis Example 1

Preparation of Fluoropolymer Precursor Dispersion (1) A 1292-L glass lined stirring autoclave was charged with 632 kg of ion exchange water (IE water) and 22.4 kg of a 50% by mass aqueous solution of $CF_3OCF(CF_3)CF_2OCF(CF_3)COONH_4$ (PMPA). The inside of the tank was sufficiently purged with nitrogen in a vacuum, and then, evacuated. Then, 40.1 kg of $CF_2=CFOCF_2CF_2SO_2F$ and 2.47 kg of $CF_4$ were put into the tank and the temperature was started to be increased. After the temperature inside the tank was stabilized at 45.7° C., TFE was charged up to 0.7 MPa. Then, 10.42 kg of a 4% by mass ammonium persulfate aqueous solution was injected to start polymerization. The polymerization was continued at a stirring speed of 145 rpm while TFE was added continually so as to adjust the pressure inside the tank to 0.7 MPa and the ratio between $CF_2=CFOCF_2CF_2SO_2F$ and TFE to be a constant value of 0.66. After 10 hours, the system was cooled and decompressed. Thereby, the polymerization was stopped.

(2) A colorless, transparent dispersion of a fluoropolymer precursor consisting of TFE and $CF_2=CFOCF_2CF_2SO_2F$ was obtained. The amount of $CF_2=CFOCF_2CF_2SO_2F$ unreacted was 22.48 kg. The solid content of the fluoropolymer precursor in the dispersion was 33.2% by mass, and the particle size was 142 nm.

(3) Part of the resulting fluoropolymer precursor dispersion was sampled. A 10% by mass $HNO_3$ was added thereto so that the polymer was coagulated. The coagulated polymer was filtered, washed, and then dried at 90° C. for 12 hours and at 120° C. for 12 hours using a hot air dryer (Safety Oven SPHH-100, Espec Corp.). Thereby, a polymer was obtained.

(4) The resulting polymer had a MFR of 2.16 and an EW of 706.
Production of Fluoropolymer Dispersion (5) A 500-L SUS316 stirring tank was charged with 120 kg of IE water and 30 kg of a 48% by mass NaOH aqueous solution. The temperature was increased such that the temperature inside the tank reached 60° C. while the components were stirred.

(6) After the temperature reached 60° C., 200 kg of the fluoropolymer precursor dispersion was added and a hydrolysis reaction was allowed to proceed for three hours while the internal temperature was maintained at 60° C. Thereby, the $SO_2F$ terminal of the polymer was converted into $SO_3Na$.

(7) IE water was added to the polymer dispersion after the hydrolysis as appropriate using an ultrafiltration device (Pellicon™, Millipore Corp.) to wash the polymer while the filtrate was discharged.

The conductivity of the filtrate was measured during the washing using Conductivity Meter B-173 available from Horiba, Ltd., and the filtrate was purified until the electric conductivity of the filtrate reached 1 μS/m. Thereby, a fluoropolymer dispersion A was obtained.

Synthesis Example 2

Preparation of Fluoropolymer Precursor Dispersion (1) A 6-L stainless steel stirring autoclave was charged with 2300 g of IE water and 482 g of a 50% by mass PMPA aqueous solution. The inside of the tank was sufficiently purged with nitrogen in a vacuum, and then evacuated. Then, 1152 g of $CF_2=CFOCF_2CF_2SO_2F$ was put into the tank and the temperature was started to be increased. After the temperature inside the tank was stabilized at 21.2° C., TFE was charged up to 0.15 MPa. Then, 10 g of a 20% by mass $Na_2SO_3$ and 10 g of 1% by mass $FeSO_4$ were put into the tank. Then, 16 g of 60% by mass ammonium persulfate was injected to start polymerization. The polymerization was continued at a stirring speed of 500 rpm while TFE was added continually so as to adjust the pressure inside the tank to 0.15 MPa. After two hours, the system was cooled and decompressed. Thereby, the polymerization was stopped.

(2) A colorless, transparent dispersion of a fluoropolymer precursor consisting of TFE and $CF_2=CFOCF_2CF_2SO_2F$ was obtained. The solid content of the fluoropolymer precursor in the dispersion was 25.4% by mass.

(3) Part of the resulting fluoropolymer precursor dispersion was sampled. A 10% by mass $HNO_3$ was added thereto so that the polymer was coagulated. The coagulated polymer was filtered, washed, and then dried at 90° C. for 12 hours and at 120° C. for 12 hours using a hot air dryer (Safety Oven SPHH-100, Espec Corp.). Thereby, a polymer was obtained.

(4) The resulting polymer had a MFR of 1.03 and an EW of 504.
Production of Fluoropolymer Dispersion (5) A 1-L polyethylene container was charged with 240 g of IE water and 60 g of a 48% by mass NaOH aqueous solution.

(6) The components were stirred well. Then, 400 g of the fluoropolymer precursor dispersion was added and a hydrolysis reaction was allowed to proceed for six hours in a temperature-constant chamber while the temperature was maintained at 60° C. Thereby, the $SO_2F$ terminal of the polymer was converted into $SO_3Na$.

(7) IE water was added to the polymer dispersion after the hydrolysis as appropriate using an ultrafiltration device (Pellicon™, Millipore Corp.) to wash the polymer while the filtrate was discharged.

The conductivity of the filtrate was measured during the washing using Conductivity Meter B-173 available from Horiba, Ltd., and the filtrate was purified until the electric conductivity of the filtrate reached 1 µS/m. Thereby, a fluoropolymer dispersion B was obtained.

Example 1

(1) The fluoropolymer dispersion A in an amount of 5 kg was placed on a metal vat (width×length×height=30 cm×41 cm×9 cm, heat transfer area A=0.123 $m^2$) and dried at 50° C. for 24 hours using a hot air dryer (Safety Oven SPHH-100, Espec Corp.). Thereby, a fluoropolymer powder was obtained.

The work was calculated under the aforementioned conditions.

(2) The solid content of the fluoropolymer powder obtained by the above operation was measured using halogen moisture analyzer MB45 available from Ohaus Corp. Then, the average secondary particle size of the powder was measured using Microtrac MT3300EXII available from MicrotracBEL Corp.

(3) Using the fluoropolymer powder obtained by the above operation, the redispersibility test was performed.

(4) The measurement results of work, solid content, average secondary particle size, and dispersion are shown in Table 1.

Example 2

Drying and measurements were performed through the same operations as in Example 1, except that the drying temperature for the fluoropolymer dispersion A was changed to 80° C.

Example 3

(1) The fluoropolymer dispersion A in an amount of 200 g was put into a 500-mL recovery flask and snap-frozen using a dry ice-acetone bath.

(2) After the freezing was confirmed, the product was freeze-dried for 24 hours using a freeze dryer (Eyela FreezeDryer FD-1, Tokyo Rikakikai Co., Ltd.).

(3) The solid content of the fluoropolymer powder obtained by the above operation was measured using halogen moisture analyzer MB45 available from Ohaus Corp. Then, the average secondary particle size of the powder was measured using Microtrac MT3300EXII available from MicrotracBEL Corp.

(4) Using the fluoropolymer powder obtained by the above operation, the redispersibility test was performed.

(5) The measurement results of work, solid content, average secondary particle size, and dispersion are shown in Table 1.

Example 4

(1) The fluoropolymer dispersion A in an amount of 5 kg was dried using a spray dryer (inner diameter 800 mm, 50-mm-diameter disc-type L-8 spray dryer, Ohkawara Kakohki Co., Ltd.) at an inlet temperature of 250° C., an outlet temperature of 110° C., an amount of liquid delivered of 4.1 kg/h, and a disc rotation speed of 32000 rpm. Thereby, a fluoropolymer powder was obtained.

(2) The solid content of the fluoropolymer powder obtained by the above operation was measured using halogen moisture analyzer MB45 available from Ohaus Corp. Then, the average secondary particle size of the powder was measured using Microtrac MT3300EXII available from MicrotracBEL Corp.

(3) Using the fluoropolymer powder obtained by the above operation, the redispersibility test was performed.

(4) The measurement results of work, solid content, average secondary particle size, and dispersion are shown in Table 1.

Comparative Example 1

(1) Drying and measurements were performed through the same operations as in Example 1, except that the drying temperature for the fluoropolymer dispersion A was changed to 100° C.

Comparative Example 2

(1) Drying and measurements were performed through the same operations as in Example 1, except that the drying temperature for the fluoropolymer dispersion A was changed to 150° C.

Comparative Example 3

(1) Drying and measurements were performed through the same operations as in Example 1, except that the drying temperature for the fluoropolymer dispersion A was changed to 200° C.

Comparative Example 4

(1) Drying and measurements were performed through the same operations as in Example 1, except that the drying temperature for the fluoropolymer dispersion A was changed to 250° C.

Comparative Example 5

(1) The fluoropolymer dispersion A in an amount of 800 g was put into a flask having an outer diameter of 15 cm and a water bath was set to 80° C. The dispersion was dried using a rotary evaporator available from Yamato Scientific Co., Ltd. Thereby, a fluoropolymer powder was obtained.

(2) The solid content of the fluoropolymer powder obtained by the above operation was measured using halogen moisture analyzer MB45 available from Ohaus Corp. Then, the average secondary particle size of the powder was measured using Microtrac MT3300EXII available from MicrotracBEL Corp.

(3) Using the fluoropolymer powder obtained by the above operation, the redispersibility test was performed.

(4) The measurement results of work, solid content, average secondary particle size, and dispersion are shown in Table 1.

Example 5

(1) Drying and measurements were performed through the same operations as in Example 3, except that the fluoropolymer dispersion B was used.

The results of the redispersibility test are shown in the following table.

TABLE 1

|  | Drying method | Work (W) | Solid content (% by mass) | Average secondary particle size (μm) | Dispersion (%) |
| --- | --- | --- | --- | --- | --- |
| Example 1 | Hot air drying 50° C. | 89.2 | 96 | 872 | 91 |
| Example 2 | Hot air drying 80° C. | 196.2 | 96 | 889 | 85 |
| Example 3 | Freeze drying | 0 | 95 | 450 | 99 |
| Example 4 | Spray drying | $1.77 \times 10^{-3}$ | 98 | 30 | 87 |
| Example 5 | Freeze drying | 0 | 95 | 488 | 89 |
| Comparative Example 1 | Hot air drying 100° C. | 267.5 | 98 | 912 | 36 |
| Comparative Example 2 | Hot air drying 150° C. | 445.9 | 99 | 992 | 29 |
| Comparative Example 3 | Hot air drying 200° C. | 624.2 | 99 | 1005 | 15 |
| Comparative Example 4 | Hot air drying 250° C. | 802.6 | 99 | 1050 | 8 |
| Comparative Example 5 | Evaporator | 802.1 | 98 | 500 | 9 |

INDUSTRIAL APPLICABILITY

The powder of the invention may be mixed with a variety of liquids and solids to provide compositions in which the fluoropolymer having an acid group and an acid salt group is highly dispersed. Such compositions can effectively be used in industrial applications.

The liquid may be any liquid having a boiling point of room temperature (25° C.) or higher.

Specific examples thereof include water, n-butylamine, diethylamine, ethylenediamine, isopropanolamine, triethanolamine, triethylenediamine, N,N-dimethylformamide, acetone, acetonitrile, methyl ethyl ketone, methyl isopropyl ketone, methyl isobutyl ketone, methyl-normal-butyl ketone, cyclohexanone, methylcyclohexanone, methylcyclohexanol, benzene, o-dichlorobenzene, toluene, styrene, xylene, cresol, chlorobenzene, chloroform, dichloromethane, 1,2-dichloroethane, 1,2-dichloroethylene, 1,2-dichloropropane, 1,1,2-trichloroethane, 1,1,1-trichloroethane, trichloroethylene, tetrachloromethane, tetrachloroethylene, tetrachloroethane, tetrahydrofuran, dioxolane, dioxane, methanol, ethanol, butanol, isobutyl alcohol, 1-propanol, isopropanol, isopentyl alcohol, cyclohexanol, cyclohexanone, 1,4-dioxane, dichloromethane, N,N-dimethylformamide, normal hexane, methyl acetate, ethyl acetate, isopropyl acetate, butyl acetate, isobutyl acetate, normal-pentyl acetate, isopentyl acetate, dimethyl sulfoxide, diethyl ether, ethylene glycol monomethyl ether, ethylene glycol monoethyl ether, ethylene glycol monoethyl ether acetate, ethylene glycol mono-normal-butyl ether, carbon disulfide, gasoline, coal tar naphtha, petroleum ether, petroleum benzine, turpentine, and mineral spirits. Natural fats and oils may also be used, such as olive oil, soybean oil, beef tallow, and lard. Silicone oil, fluorine-based oil, and fluorine-based alcohol may also be used.

The solid is preferably a powder having a particle size of 10 mm or smaller. Any of organic and inorganic materials may be used.

Owing to its high industrial utility value, the solid is particularly preferably a polymer material. Specific examples thereof include polyolefin resins, including fluororesins such as polytetrafluoroethylene (PTFE), tetrafluoroethylene/perfluoro(alkyl vinyl ether) copolymers (PFA), tetrafluoroethylene/hexafluoropropylene copolymers (FEP), ethylene/tetrafluoroethylene copolymers (ETFE), and polyvinylidene fluoride (PVdF), fluoroelastomers such as vinylidene fluoride (VdF)/hexafluoropropylene (HFP) copolymers, polyethylene, and polypropylene; polyamide (PA) resins such as nylon 6, nylon 11, nylon 12, nylon 46, nylon 66, nylon 610, nylon 612, and nylon MXD6; polyesters such as polyethylene terephthalate (PET), polybutylene terephthalate (PBT), polyarylate, aromatic polyesters (including liquid crystal polyester), and polycarbonate (PC); polyacetal (POM) resin; polyether resins such as polyphenylene oxide (PPO), modified polyphenylene ether, and polyether ether ketone (PEEK); polyamide-imide (PAI) resins such as polyaminobismaleimide; polysulfone resins such as polysulfone (PSF) and polyethersulfone (PES); vinyl polymers such as ABS resin and poly4-methylpentene-1 (TPX resin); polyphenylene sulfide (PPS), polyketone sulfide, polyether imide, and polyimide (PI).

Examples of the polyolefin resins include polymers obtainable by polymerizing an α-olefin such as polyethylene (PE), polypropylene (PP), ethylene-propylene copolymers, polystyrene (PS), AS resin (AS), ABS resin (ABS), methacrylic resin (PMMA), polymethyl pentene (PMP), butadiene resin (BDR), polybutene-1 (PB-1), polyvinyl alcohol (PVA), polyacrylonitrile (PAN), polymethacrylstyrene (MS), ethylene/vinyl acetate copolymers (EVA), ethylene/vinyl alcohol copolymers, and polyvinyl chloride (PVC).

The polyolefin resin is preferably at least one selected from the group consisting of low-density polyethylene (LDPE), linear low-density polyethylene (LLDPE), metallocene linear low-density polyethylene (mLLDPE), middle-density polyethylene (MDPE), high-density polyethylene, polypropylene (PP), polystyrene (PS), ethylene/vinyl acetate copolymers (EVA), and polyvinyl chloride (PVC). It is more preferably at least one selected from the group consisting of low-density polyethylene, linear low-density polyethylene, high-density polyethylene, metallocene linear low-density polyethylene, polypropylene, polystyrene, and polyvinyl chloride.

A composition containing the powder of the invention and a rubber may be prepared by mixing the powder of the invention with a rubber such as natural rubber, isoprene rubber (IR), butadiene rubber (BR), styrene-butadiene rubber (SBR), chloroprene rubber (CR), nitrile rubber (NBR), butyl rubber (IIR), ethylene-propylene rubber (EPM, EPDM), chlorosulfonated polyethylene (CSM), acrylic rubber (ACM), fluoroelastomer, epichlorohydrin rubber (CO, ECO), urethane rubber, or silicone rubber. In an exemplary method, the powder of the invention and a rubber are kneaded using an open roll, a Banbury mixer, a pressure kneader, an extruder, or the like.

A composition containing the powder of the invention and a thermoplastic resin may be prepared by mixing the powder of the invention with a thermoplastic resin such as polycarbonate, polyolefin, polyvinyl chloride, polystyrene, polyester, polyamide, ABS resin, or acrylic resin. In an exemplary method, the powder of the invention and a thermoplastic resin are mixed using a mixer such as a V-type blender, a tumbler mixer, or a Henschel mixer, and then the mixture is kneaded using a melt-kneading device such as a twin-screw extruder. In another method, the powder of the invention may be supplied to a thermoplastic resin in a molten state in a melt-kneading device.

A composition containing the powder of the invention and a thermosetting resin may be prepared by mixing the powder of the invention with a thermosetting resin such as urethane resin or epoxy resin. In an exemplary method, the powder of the invention and a thermosetting resin in an uncured state are dry mixed in advance using, for example, a mixer, and then the mixture is kneaded using a roll. In another method, the powder and a thermosetting resin in an uncured state are mixed in a molten state using a kneader or an extruder.

The invention claimed is:

1. A powder comprising a fluoropolymer and having an aspect ratio of 3 or lower,
    the fluoropolymer containing at least one group A selected from the group consisting of —$SO_2Y$, —COOR, —$SO_3X$, —$SO_2NR^1_2$, and —COOX,
    wherein Y is a halogen atom; R is a $C_1$-$C_4$ alkyl group; X is $M_{1/L}$ or $NR^1_4$, where M is a hydrogen atom or an L-valent metal, the L-valent metal being a metal in group 1, group 2, group 4, group 8, group 11, group 12, or group 13 of the periodic table; and $R^1$s are each individually a hydrogen atom or a $C_1$-$C_4$ alkyl group,
    the powder exhibiting a dispersion of 50% or higher, the dispersion being calculated by filtering a composition obtained by mixing the powder with water through a mesh having an opening of 20 μm,
    wherein the powder has an average primary particle size of greater than 30 nm to 300 nm.

2. The powder according to claim 1,
    wherein the powder contains 0 to 20% by mass of volatile matter.

3. The powder according to claim 1,
    wherein the fluoropolymer contains a constitutional unit derived from a fluoromonomer represented by the following formula (I):

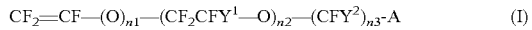

$$CF_2=CF-(O)_{n1}-(CF_2CFY^1-O)_{n2}-(CFY^2)_{n3}-A \qquad (I)$$

wherein $Y^1$ is a halogen atom or a perfluoroalkyl group; n1 is an integer of 0 or 1; n2 is an integer of 0 to 3; n2 $Y^1$s are the same as or different from each other; $Y^2$ is a halogen atom; n3 is an integer of 1 to 8; n3 $Y^2$s are the same as or different from each other; and A is the same as the group A.

4. The powder according to claim 3,
    wherein the fluoropolymer is a copolymer of two or more monomers and contains a constitutional unit derived from a fluoromonomer represented by the formula (I) and a constitutional unit derived from a different fluorine-containing ethylenic monomer.

5. The powder according to claim 4,
    wherein the fluorine-containing ethylenic monomer is at least one species of monomers represented by the following formula (II):

$$CF_2=CF-R_f^1 \qquad (II)$$

wherein $R_f^1$ is a fluorine atom, a chlorine atom, $R_f^2$, or $OR_f^2$, where $R_f^2$ is a $C_1$-$C_9$ linear or branched perfluoroalkyl group optionally containing an ether bond.

6. The powder according to claim 5,
    wherein any or all of the monomers represented by the formula (II) are tetrafluoroethylene.

7. The powder according to claim 3,
    wherein in the formula (I), $Y^1$ is a trifluoromethyl group, $Y^2$ is a fluorine atom, n1 is 1, n2 is 0 or 1, and n3 is 2.

8. A method for producing the powder according to claim 1, comprising:
    a step (1) of preparing an aqueous dispersion (a) by emulsion polymerization, the aqueous dispersion (a) containing a fluoropolymer that contains at least one group selected from the group consisting of —$SO_2Y$ and —COOR, wherein Y is a halogen atom; and R is a $C_1$-$C_4$ alkyl group;
    a step (2) of adding an alkali or an acid to the aqueous dispersion (a) to provide an aqueous dispersion (b), the aqueous dispersion (b) containing a fluoropolymer that contains at least one group selected from the group consisting of —$SO_3X$, —$SO_2NR^1_2$, and —COOX, wherein X is $M_{1/L}$ or $NR^1_4$, where M is a hydrogen atom or an L-valent metal, the L-valent metal being a metal in group 1, group 2, group 4, group 8, group 11, group 12, or group 13 of the periodic table; and les are each individually a hydrogen atom or a $C_1$-$C_4$ alkyl group;
    a step (3) of filtering the aqueous dispersion (b) and collecting a residue; and
    a step (4) of drying the residue at a work of 200 W or lower to provide a powder containing 0 to 20% by mass of volatile matter.

* * * * *